United States Patent [19]

Ponticelli

[11] Patent Number: 4,699,341
[45] Date of Patent: Oct. 13, 1987

[54] SYSTEM FOR MOUNTING RADIO EQUIPMENT IN VEHICLES

[76] Inventor: Robert J. Ponticelli, 115 Buckskin Rd., Bell Canyon, Calif. 91307

[21] Appl. No.: 457

[22] Filed: Jan. 5, 1987

[51] Int. Cl.$^4$ .............................................. G12B 9/00
[52] U.S. Cl. ................................. 248/27.1; 248/27.3; 312/7.1; 455/345
[58] Field of Search ................. 248/27.1, 27.3, 56, 248/57, 310, 316.7; 312/7.1; 455/345

[56] References Cited

U.S. PATENT DOCUMENTS

| | | | |
|---|---|---|---|
| 2,974,918 | 3/1961 | Voigtlander | 248/201 |
| 3,922,047 | 11/1975 | Tsuji | 312/7.1 X |
| 4,033,531 | 7/1977 | Levine | 248/558 |
| 4,067,654 | 1/1978 | Maniaci | 403/4 |
| 4,211,976 | 7/1980 | Inoue | 455/345 X |
| 4,238,139 | 12/1980 | Suzuki et al. | 312/7.1 |
| 4,245,872 | 1/1981 | Kakiei | 312/7.1 X |
| 4,447,030 | 5/1984 | Nattel | 248/27.1 |
| 4,462,564 | 7/1984 | Alves et al. | 312/7.1 X |
| 4,524,933 | 6/1985 | Rouws | 248/27.3 |
| 4,555,080 | 11/1985 | Nara | 248/27.1 |
| 4,560,124 | 12/1985 | Alves et al. | 248/27.1 |
| 4,562,595 | 12/1985 | Bauer et al. | 455/345 |
| 4,572,465 | 2/1986 | Rasca | 248/27.1 |

FOREIGN PATENT DOCUMENTS 0508555 1/1955 Italy ..................................... 455/345

Primary Examiner—Ramon O. Ramirez
Attorney, Agent, or Firm—Edward A. Sokolski

[57] ABSTRACT

A rectangular frame has a plurality of similar closed slots formed in each of the sides thereof. A tray for supporting a radio or the like has a plurality of tabs which are adapted to be fitted into selected slots formed on the frame as may be required for mounting a particular piece of radio equipment in a particular vehicle. A front panel for this radio equipment has similar tabs thereon so that it can selectively be mounted in a desired position for the particular radio installation with the tabs fitted into selected mating slots formed in the frame. Mounting brackets for the particular installation are fitted into selected slots on the frame to enable the proper mounting of the equipment in a vehicle. Various mounting brackets and front panels are provided to adapt to various radio equipment installations in conjunction with the multi slotted frame which is adapted to receive the tray, front panel, and mounting brackets in a variety of different configurations each of which is adapted to a particular installation.

4 Claims, 16 Drawing Figures

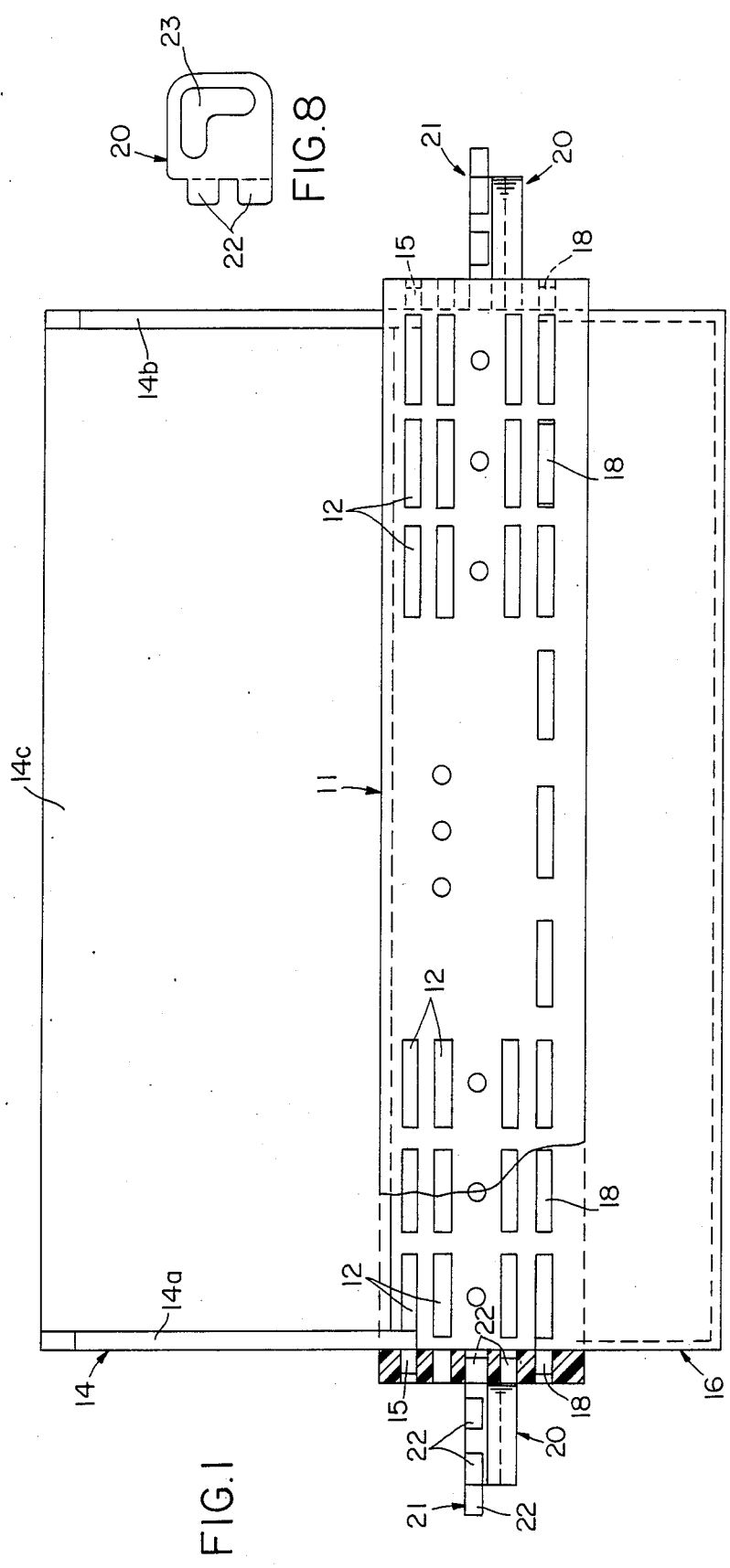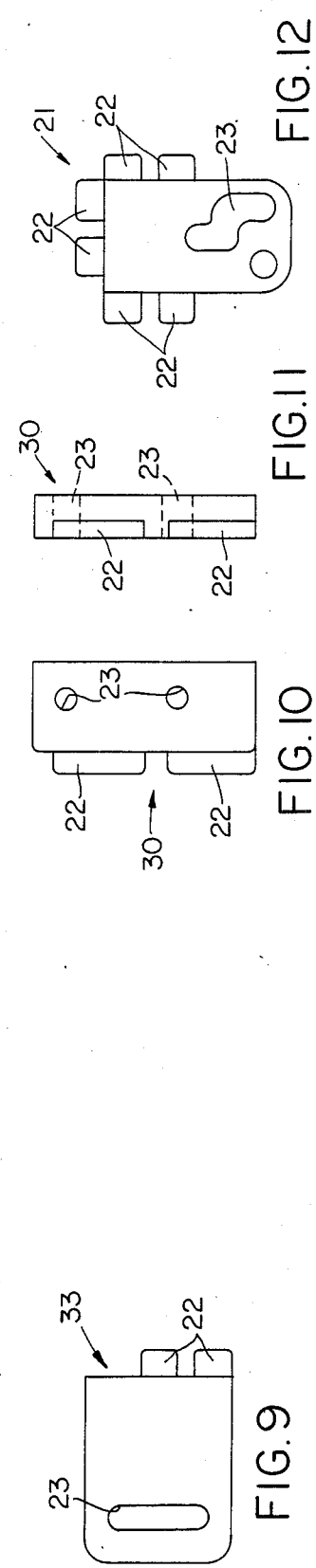

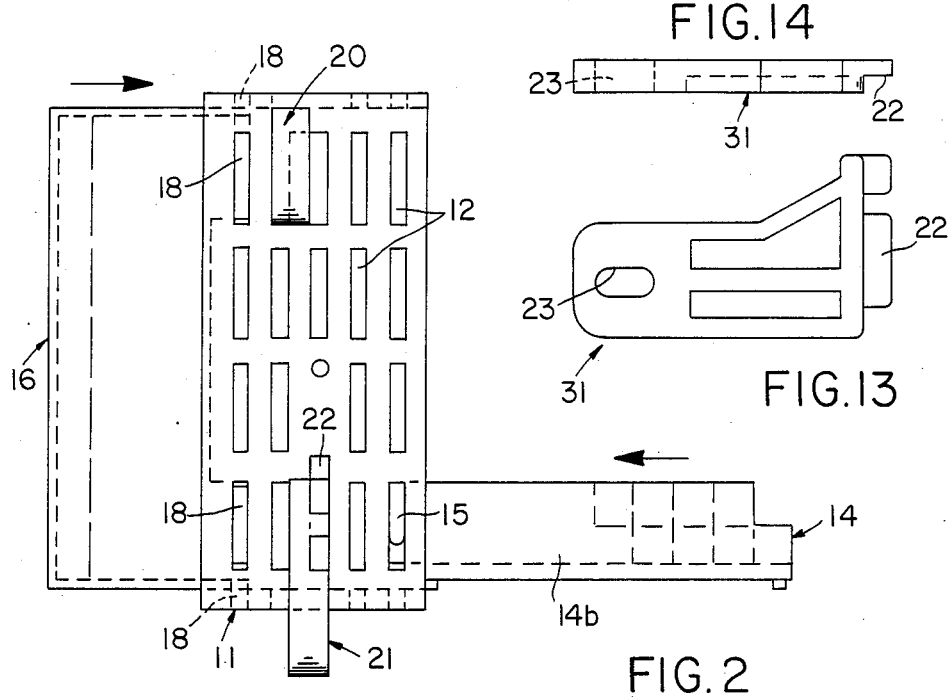
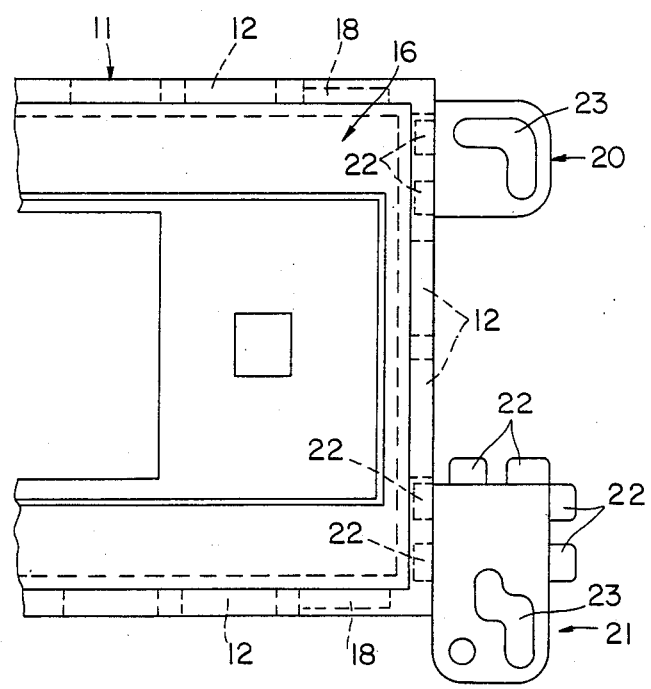

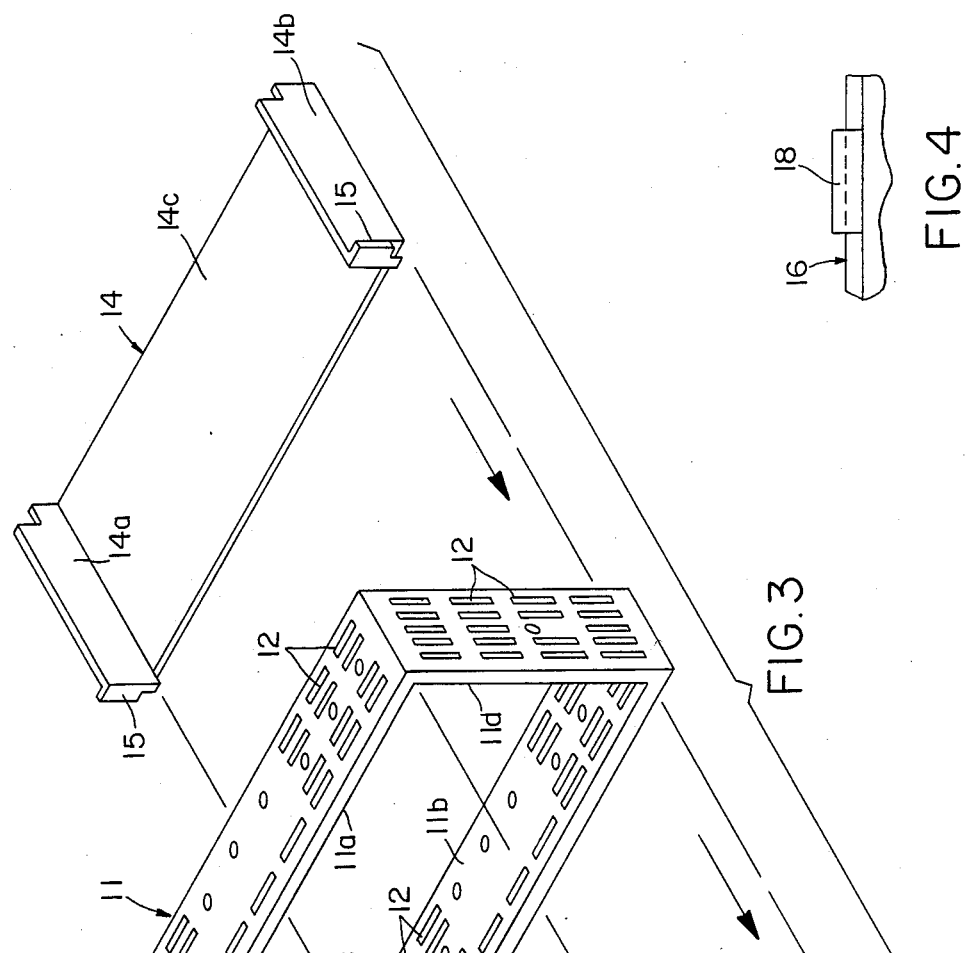

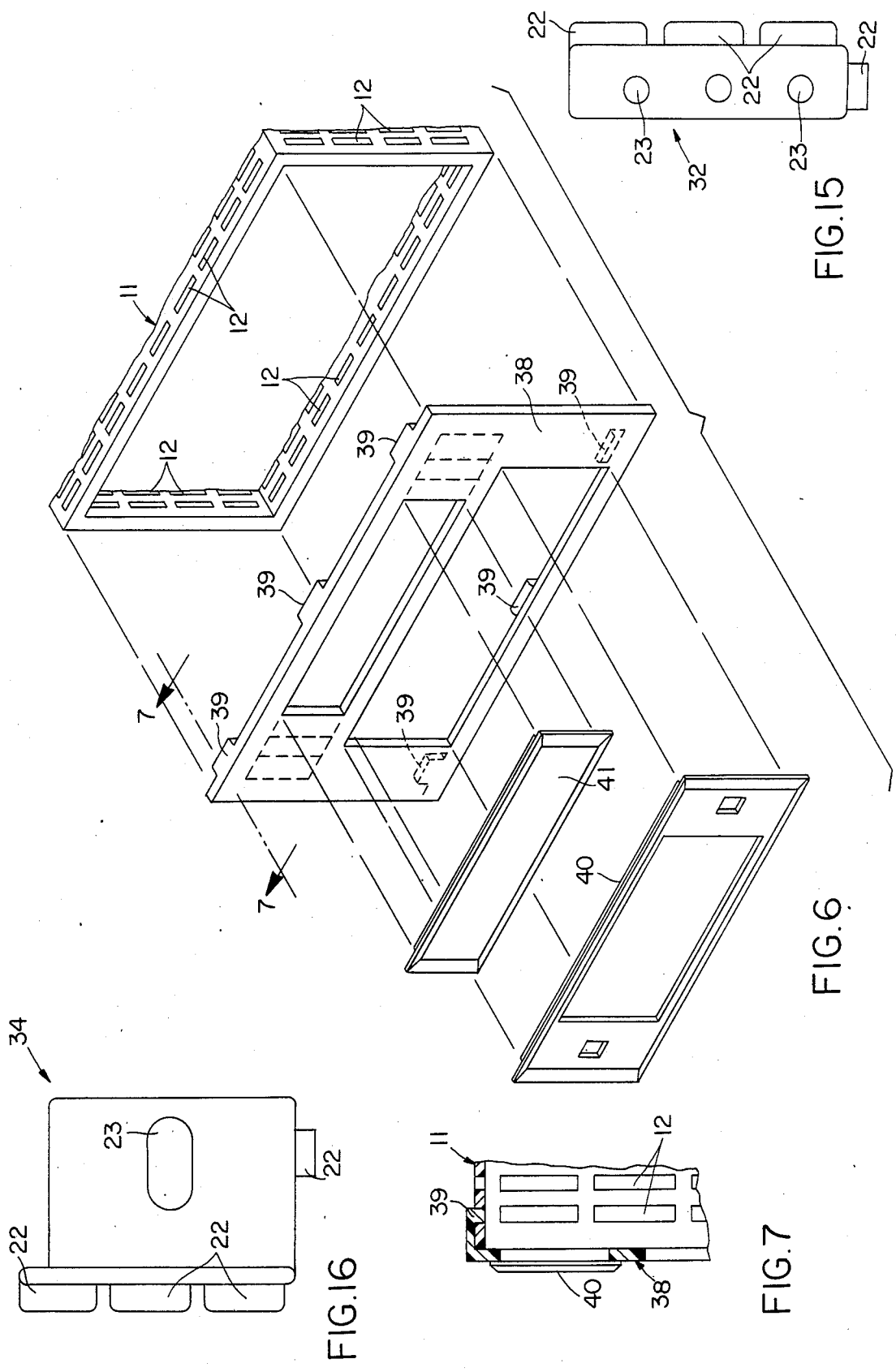

SYSTEM FOR MOUNTING RADIO EQUIPMENT IN VEHICLES

This invention relates to the installation of radios in vehicles and more particularly to an installation kit capable of use in installing a great variety of different vehicle radio installations.

With the great variety of different vehicles and radio equipment available for installation therein, installation of a particular radio in a particular vehicle requires special installation hardware and mounts. This greatly complicates the installer's problem in that it is necessary to stock a variety of components adapted for use with different radio equipment as installed in each particular vehicle.

An attempt to alleviate this problem is described in U.S. Pat. No. 4,462,564. In the system of this patent, open slots are formed in the sides of a frame which enable the mounting of support brackets for the radio at preselected positions therealong where they are clamped in position by means of a locking screw.

The system of the present invention obviates the need for such locking screws and provides a greater versatility of mounting choices by employing a plurality of closed mounting slots formed through each of the walls of a rectangular mounting frame, these mounting slots being all similar in size and shape and being arranged both longitudinally and transversely in the frame walls. Interlocking tabs are provided on a tray member and a front panel member, these interlocking tabs being adapted to matingly engage the slots formed in the frame. Thus, both the tray and the front panel can be attached to the frame at any one of a variety of different positions as may be required for the particular installation at hand. A variety of different types of mounting brackets are provided for use in attaching the frame to the vehicle and for supporting radio control shafts as may be required, each of these mounting brackets having one or more interlocking tabs which snap into the slots in the frame in mating engagement therewith.

The system of the present invention thus makes for a universal mounting kit which is adapated to handle the installation of a great variety of different pieces of radio and related audio equipment in a great variety of different vehicles. The use of snap in type tabs for joining the components of the system together simplifies and speeds up installation, obviating the need for tools in joining the components of the system together, tools only being required for joining the assembled system to the vehicle and to the radio equipment (if need be).

It is therefore an object of this invention to facilitate the installation of radio equipment in vehicles.

It is a further object of this invention to provide a universal mounting kit for mounting a variety of different pieces of radio equipment in the different vehicles.

Other objects of the invention will become apparent as the description proceeds in connection with the accompanying drawings of which:

FIG. 1 is a top plan view illustrating a preferred embodiment of the invention in assembled form;

FIG. 2 is a side elevational view of the preferred embodiment;

FIG. 3 is an exploded perspective view illustrating the assembly of the preferred embodiment;

FIG. 4 is a view taken along the plane indicated by 4—4 in FIG. 3 showing the units as assembled;

FIG. 5 is a partial sectional view in front elevation of the preferred embodiment;

FIG. 6 is an exploded perspective view illustratiang an alternative front panel which may be employed in the system of the invention;

FIG. 7 is a view taken along the plane indicated by 7—7 in FIG. 6;

FIG. 8 is a side elevational view of a first mounting bracket which may be used in the system of the invention;

FIG. 9 is a side elevational view of a second mounting bracket;

FIG. 10 is a side elevational view of a third mounting bracket;

FIG. 11 is an end elevational view of the bracket of FIG. 10;

FIG. 12 is a side elevational view of a fourth mounting bracket;

FIG. 13 is a side elevational view of a fifth mounting bracket;

FIG. 14 is a top plan view of the bracket of FIG. 13;

FIG. 15 is a side elevational view of a sixth mounting bracket; and

FIG. 16 is a side elevational view of a seventh mounting bracket.

Referring now to FIGS. 1-5 a preferred embodiment of the invention is illustrated. Rectangular frame member 11 has a plurality of slots 12 formed in each of the pairs of opposing flat walled sides 11a, 11b and 11c, 11d thereof, these slots being longitudinal and being spaced from each other both longitudinally and transversely on each frame side. Thus, there is a pattern of slots in each side of the frame which cover a substantial portion of each such side, forming longitudinal and transverse rows of such slots, these slots extending through the sides. In the preferred embodiment, the mounting slots have the same length and width.

Tray member 14 has upstanding sides 14a and 14b which extend from a flat plate portion 14c, these sides each having a tab 15 extending outwardly therefrom. Tabs 15 are adapted to snap into a selected pair of slots 12 in mating engagement therewith, thereby attaching the tray to the frame in a desired location thereon. Typically tray 14 will be snapped into position with its tabs in a selected pair of slots in the bottom row of slots of the sides of the frame to accommodate a particular radio installation.

Front panel member 16 has tabs 18 formed on the top, bottom and side walls thereof. These tabs are adapted to snap into a selected group of slots 12 of the frame in mating engagement therewith to mount front panel assembly 16 in a selected position on the frame at a desired depth position.

Mounting brackets 20 and 21 have tabs 22 a pair of which together fit into a selected one of the slots 12 of frame 11, the mounting brackets having apertures 23 for receiving a bolt or machine screw for attaching the frame to the vehicle. These brackets come in a variety of forms with various shaped and dimensioned apertures 23 to accommodate various mounting requirements. A number of different such brackets 30, 31, 32, 33 and 34 are shown in FIGS. 10, 11 and 13-16 for illustrative purposes. It is to be noted that the tabs 22 in certain instances are slightly less in length than slots 12 to provide snap-in engagement of a single such tab, while in other instances a pair of such tabs which are spaced to form a snap-in engagement in the slots are employed. Bracket 34 as shown in FIG. 16 is specially adapted for mounting in selected slots on the frame inwardly from one of the side walls of the frame for use in supporting a radio volume control shaft or the like.

An alternate form of front panel member 38 for use in lieu of panel member 16 is shown in FIG. 6. This type of front panel has tabs 39 which snap into appropriate slots 12 close to the edges of frame 11. A trim plate 40 and a cover plate 41 may be used in conjunction with panel 38 to modify the openings provided in this panel as need be.

Thus as can be seen various arrangements of front panels, support trays, and mounting brackets can be used in conjunction with frame 11 to accommodate to various installation requirements. It should be apparent that a variety of other panels and mounting brackets having suitable mounting tabs which mate with slots 12 can be employed to satisfy a great number of different installation requirements.

While the invention has been described and illustrated in detail, it is to be clearly understood that this is intended by way of illustration and example only and is not to be taken by way of limitation, the spirit and scope of the invention being limited only by the terms of the following claims.

I claim:

1. A mounting kit for use in mounting a radio or the like in a vehicle comprising:

a frame member having at least one pair of opposing substantially flat walls, said walls having a plurality of closed slots formed therein, said slots being arranged in patterns extending both longitudinally and transversely in said walls, and a plurality of mounting brackets, said brackets having tab means extending therefrom, said tab means being dimensioned relative to said slots so as to snap into any one of said slots in locking engagement therewith.

2. The mounting kit of claim 1 and further including a front panel member having a plurality of tabs extending therefrom said tabs being adapted to snap into a selected group of the slots in locking engagement therewith in any one of several mounting positions.

3. The mounting kit of claim 2 and further including a tray member having a flat plate portion and upstanding opposite sides extending normally from said plate portion, said sides each having a tab member extending therefrom, said tray tab members being adapted to fit into said slots in locking engagement therewith in any one of a plurality of different mounting positions on said frame.

4. The kit of claim 1 wherein said frame member is substantially rectangular and has two pairs of opposing walls each of said walls having a plurality of said slots formed therein.

* * * * *